US006801117B2

(12) United States Patent
Morris, Jr. et al.

(10) Patent No.: US 6,801,117 B2
(45) Date of Patent: Oct. 5, 2004

(54) FAULT SENSING WIRE AND ALARM APPARATUS

(75) Inventors: Shelby J. Morris, Jr., Hampton, VA (US); Kenneth S. Watkins, Jr., Dahlonega, GA (US)

(73) Assignee: B.P.W., Inc., Cumming, GA (US)

( * ) Notice: Subject to any disclaimer, the term of this patent is extended or adjusted under 35 U.S.C. 154(b) by 0 days.

(21) Appl. No.: 10/306,773

(22) Filed: Nov. 26, 2002

(65) Prior Publication Data

US 2003/0137392 A1 Jul. 24, 2003

Related U.S. Application Data

(63) Continuation of application No. 09/555,823, filed as application No. PCT/US98/26290 on Dec. 10, 1998, now Pat. No. 6,512,444.
(60) Provisional application No. 60/069,046, filed on Dec. 10, 1997.

(51) Int. Cl.[7] .................. H01H 37/14; H01H 37/02; H01H 5/04
(52) U.S. Cl. .................. 337/401; 337/405; 337/299; 337/404; 337/167; 361/104; 219/219; 219/510
(58) Field of Search .................. 337/158, 167, 337/298–300, 401–405; 361/103, 104; 219/110, 241, 485, 488–494, 497, 501, 510; 315/150, 158, 159

(56) References Cited

U.S. PATENT DOCUMENTS

| 3,610,808 A | 10/1971 | Horwinski |
| 4,577,094 A | 3/1986 | Mills |
| 4,607,154 A | 8/1986 | Mills |
| 4,698,583 A | 10/1987 | Sandberg |
| 4,707,686 A | 11/1987 | Greenhalgh |
| 5,143,649 A | 9/1992 | Blackledge et al. |
| 5,541,803 A | 7/1996 | Pope, Jr. et al. |
| 5,841,617 A | 11/1998 | Watkins, Jr. et al. |
| 5,862,030 A | 1/1999 | Watkins, Jr. et al. |
| 5,999,384 A | 12/1999 | Chen et al. |
| 6,288,372 B1 | 9/2001 | Sandberg et al. |

Primary Examiner—Anatoly Vortman
(74) Attorney, Agent, or Firm—Alston & Bird LLP

(57) ABSTRACT

A fault sensing electrical wire (411) utilized one or more sensor strips (407) which provide an impedance change when the wire is subject to an overtemperature condition or mechanical damage of the wire. A control unit (402) measures the impedance of the sensor strips of the fault sensing wire and provides a control signal (405) to initiate an alarm or protective action based on the severity of the condition. The control unit (402) may monitor a number of fault sensing sires simultaneously or in sequence. The apparatus may be used to sense an electrical arc occurring in the insulation of the wire.

5 Claims, 11 Drawing Sheets

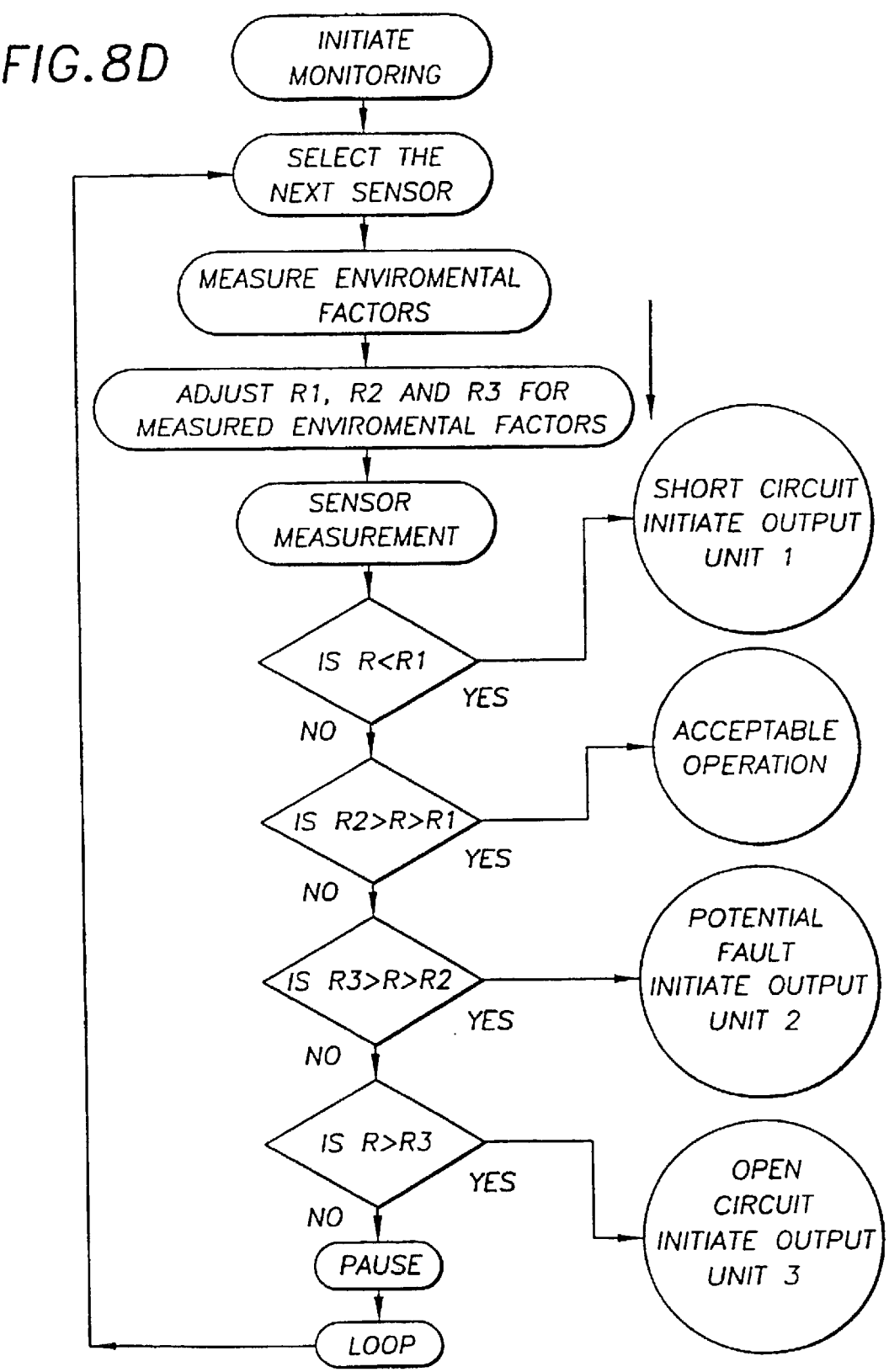

FAULT SENSING WIRE AND ALARM APPARATUS

CROSS-REFERENCE TO RELATED APPLICATIONS

The present application is a continuation of and claims the full benefit and priority to U.S. application Ser. No. 09/555,823 filed Jun. 5, 2000, now U.S. Pat. No. 6,512,444 B1, issued Jan. 28, 2003, which in itself claims the full benefit and priority to International Application No. PCT/US98/26290, filed Dec. 10, 1998, and through that application also claims the benefit and priority of U.S. Provisional Application Ser. No. 60/069,046, filed Dec. 10, 1997.

BACKGROUND OF THE INVENTION

Electrical powered devices are subjected to numerous conditions which can result in fire, injury by burning, injury by electrical shock, or the release of toxic fumes. For example, aging or mechanical damaged electrical insulation can produce local short-circuits, and overheating and perhaps ignition of the surroundings because of these electrical short-circuits. Electrical overloads and overheating and potentially ignition of surrounding combustibles can be caused by electrical motors which have either seized, or been mechanically blocked from rotating, or deprived of the necessary cooling flow. Electrical wiring, cable and power cords can be damaged by rough treatment, carelessness, or exposure to a harsh or corrosive environment.

Numerous safety devices have been disclosed previously. Present practice is to have a circuit breaker which will open the circuit if a preselected current is exceeded for a selected period of time and, in some high risk circuits, to utilize a ground fault protection circuit breaker which will open the electrical circuit, if any of the circuit's current leaks to ground. Other electrical safety devices have been proposed but have not received widespread use perhaps because of excess cost, complexity, electrical, or mechanical limitations as well as concerns about the safety of the device itself. Many fires are caused by improper or loose electrical connections, which create high electrical resistance and an over-temperature condition which results in electrical fires, but do not exceed the electrical current limits of the circuit breaker or involve a leakage of electrical current to ground.

Other safety devices sense the temperature at selected points along the electrical cord or at points within the electrical component or components. For example, fusible links which melt and open an electrical circuit upon over-temperature conditions have been proposed and have received limited use. Other devices employ thermistors, RTDs, or other temperature sensitive elements, which, in conjunction with a sensing and control circuit, monitor the temperatures of the sensor and reduce or cutoff the power to the effected device if the sensor overheats. Because these devices detect overheating only at certain points, these safety devices protect only at discreet locations. Dangerous overheating conditions at unprotected points may go undetected. In addition, the protection of a long electrical power cord is not feasible, using this discreet technology, because of the very large number of sensors required to protect such a large distributed surface area.

Modern complex machinery adds additional requirements for electrical power distribution, control wiring, and communication. For example, a modern aircraft utilizes numerous circuits which require a high level of reliability and safety. Routine inspections alone are not sufficient to ensure that electrical wiring and cables are in satisfactory condition. Much of the wiring is inaccessible, and visual inspection may not indicate deterioration of insulation.

Mechanical damage or thermal or chemical deterioration may lead to current paths from energized conductors through the insulation in the wiring or cable. Ignition of the insulation may form additional low resistance paths to ground or other return paths, leading to a condition known as arc tracking. Since damage to the wiring and nearby components may be extensive, a method is needed to indicate deterioration of the wire before it is significant enough to cause an arc.

OBJECTS AND SUMMARY OF THE INVENTION

Therefore an object of the present invention is to provide a fault sensing wire and alarm apparatus capable of real time sensing the condition of a large number of wires, cables, and power cords, and providing indication of unsafe conditions before severe faults occur.

Another object of the present invention is to provide a fault sensing wire and apparatus which detects an overtemperature condition along any portion of the wire.

Another object of the invention is to provide a fault sensing wire and apparatus which detects mechanical damage to the wire which might result in a short.

Another object of the invention is to provide multiple fault sensing wires and apparatus which allows monitoring of the multiple fault sensing wires for unsafe conditions.

Another object of the invention is to provide multiple fault sensing wires and apparatus which discriminates between the severity and type of potential faults in the sensor wire.

Another object of the invention is to provide a fault sensing wire and apparatus which utilizes one or more environmental sensors to modify setpoints of a controller.

Another object of the invention is to provide a fault sensing wire and apparatus which is capable of detecting low level arcing conditions.

The electrical safety device of the present invention comprises a fault sensing wire and apparatus which monitors the condition of the wire and provides indication, alarms or appropriate actions to prevent or mitigate unsafe electrical conditions. The fault sensing wire comprises an electrical conductor and a sensor strip distributed in the insulation surrounding the conductor. The sensor strip comprises a thermal responsive element and a mechanical damage responsive element. The temperature responsive element comprises a material distributed along the substantial length of the fault sensing wire which has a positive coefficient of resistivity which increases with temperature. The mechanical damage responsive element is a conductive material distributed along the substantial length of the fault sensing wire disposed between the conductor and as much of the outside surface of the wire as practical. In this manner, an object which cuts, abrades, or frays the outside surface of the wire will cut or open the mechanical damage responsive element before the external object contacts the conductor. The temperature responsive element and the mechanical damage responsive element functions may be performed by a single sensor strip, or the functions may be performed by a plurality of sensor strips.

In one embodiment, the sensor strip is a conductive polymer having a positive temperature coefficient of resistivity which increases with temperature. The temperature-resistance response of such a material results in a response region in which the resistance increases slowly with temperature until a "switch" region is reached. After this "switch" region, the resistance increases rapidly with temperature. This "switch" action results in the ability to detect relatively short fault regions in the wire.

Another embodiment distributes the sensor strip in a helical pattern in the insulation around the conductor. In this way, the sensor strip performs the functions of the temperature responsive element and the mechanical damage sensing element, which are in fact, the same element. In other embodiments, a plurality of thermal responsive elements are disposed longitudinally in the insulation and spaced radially about the conductor. By connecting the ends of the thermally responsive elements together with shunts, the series connected matrix of thermally responsive elements forms the sensor strip and performs both thermal sensing and mechanical damage sensing functions. In still other embodiments, the mechanical damage responsive element may be a metallic wire disposed in a helical pattern around the conductor, and the thermal responsive element may be a conductive polymer strip. The thermal responsive element and the mechanical damage sensing element may be connected in series to form the sensor strip.

To provide control functions, the sensor strip of a fault sensing wire is connected to a control unit. The control unit comprises an impedance or resistance measuring circuit and an output unit. The control unit may be a comparator which compares the impedance of the sensor strip to a set or reference value. If the measured impedance exceeds the set value, the output of the comparator changes states and activates an alarm, a circuit trip element such as a breaker, or a relay performing some other action based on the measured value of the sensor strip impedance.

Due to the non-linear response of the conductive polymer having a positive temperature coefficient of resistivity which increases with temperature, the magnitude of the impedance of the sensor strip provides an indication of the thermal and/or mechanical condition of the wire. For example, a resistance in the range less than the "switch" area of the resistance-temperature curve may represent an overtemperature, but less than damaging condition in the wire. An appropriate output may be an alarm activating signal. The resistance in the range above the "switch" area may indicate a potential damaging overtemperature. An appropriate output may be a trip of a circuit breaker providing current to the conductor. For an open in the sensor strip ("infinite" resistance), indicating mechanical damage such as fraying of the wire, an appropriate output may be a signal to an alarm indicating that inspection of the wiring is necessary. Still another resistance reading of near zero may indicate a sort or other improper condition of the apparatus and initiate a different alarm. Several comparators with different setpoints may be used to monitor the same fault sensing wire to activate different outputs depending on the magnitude of the impedance. Logic circuits or a microprocessor may be used to select the appropriate response based on the magnitude of the measured impedance.

Another embodiment utilizes a multiplexer to sample sensor strips in a plurality of fault sensing wires. A microprocessor may be used to sample each sensor strip and compare a measured impedance to one or more setpoints stored in the microprocessor. An environmental sensor such as an external temperature sensor may used to adjust the setpoints in the memory of the microprocessor to enhance the response of the apparatus under varying conditions.

BRIEF DESCRIPTION OF THE DRAWINGS

These and other features, aspects and advantages of the present invention will become better understood with regard to the following description, appended claims and accompanying drawings where:

FIG. 8D is a logic diagram of an adaptive mode to modify the setpoints of a microprocessor of the present invention.

DESCRIPTION OF THE PREFERRED EMBODIMENTS

The following is a description of the preferred embodiments of an overtemperature and mechanical damage sensing wire and apparatus providing a response to an unsafe condition of the wire.

Figure 1:
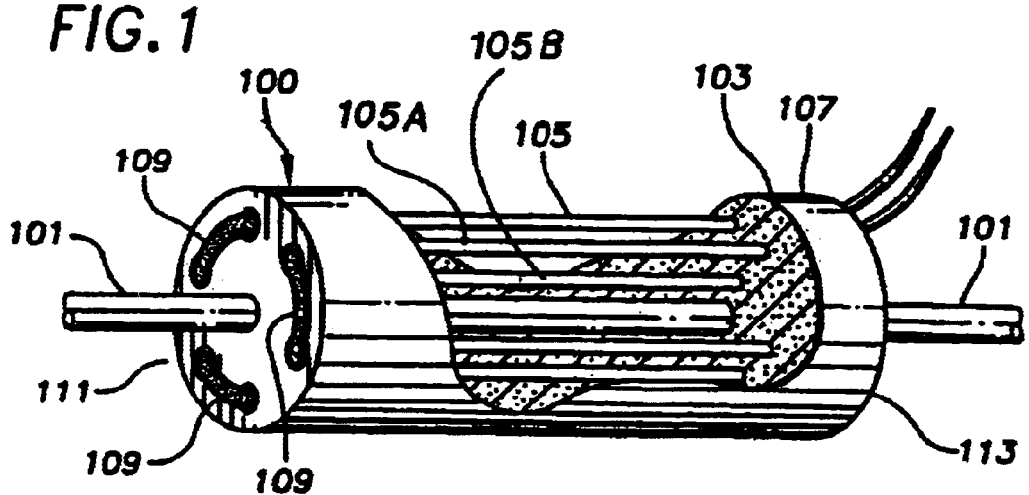
FIG. 1 is a partial cutaway perspective drawing of an overtemperature and mechanical damage fault sensing wire of the present invention utilizing several longitudinally disposed sensor strips surrounding the conductor in an insulated wire.

FIG. 1 is a partial cutaway perspective drawing of a fault sensing wire 100 comprising a conductor 101 surrounded by insulation 103. Conductor 101 may be any electrical conductor used to conduct electrical current, either direct current, alternating current, or pulsed current. In the preferred embodiment, conductor 101 is a metallic conductor, either solid, stranded or braided. In other embodiments, conductor 101 is a conductive polymer.

Insulation 103 is an insulator material having a high d.c. resistance and good dielectric strength. In the preferred embodiment, insulation 103 may be an elastomer, thermoplastic or thermosetting plastic. In the preferred embodiment, insulation 103 is applied by extrusion in a die when conductor 101 is passed through the die.

Sensor strips 105 are electrically conductive strips disposed in insulation 103 between conductor 101 and outside surface 107. In the preferred embodiment, the sensor strip material has a positive temperature coefficient of resistivity (PTC) which has a relatively low value at operating temperatures and a relatively high value at temperatures which may result in failure of the insulation of the wire, or temperatures which are likely to cause a fire. Certain conductive polymers exhibit such properties and may include both intrinsically conductive polymers and filled polymers. Filled polymers may include thermoplastic and thermoset polymers, copolymers, elastomers and natural or synthetic rubbers. Electrically conducting fillers may include metal particles or fibers such as stainless steel, aluminum, nickel, copper, and silver. Carbon based fillers may also be used. Several polymers and fillers may be combined to optimize the conductivity and "switching effect" of the sensor.

In addition to an increasing PTC with temperature, some of these materials also exhibit mechanical properties which are advantageous to use as distributed temperature sensors in wire. Theses properties include good flexibility, high elongation, and good cracking resistance. Some of these materials are extrudable and some are co-extrudable with common insulation polymers such as low and high density polyethylene and polyvinyl chloride. Some of these materials may be used in injection molding, or in co-molding with common polymers used in wire insulation, receptacles and plugs. Still other conductive polymers may be applied as hot melts, coatings, or inks. The temperature-impedance relationship provided by these materials provide additional features as discussed in additional embodiments of the present invention.

Sensor strips 105 of FIG. 1 are spaced radially about conductor 101 with the longitudinal axis of sensor strips 105 generally parallel to the longitudinal axis of conductor 101. In the preferred embodiment, a sufficient quantity of sensor strips 105, including strips 105A and 105B, are spaced radially about conductor 101 so that mechanical damage such as cutting or fraying of a relatively small portion of insulation 103 between outside surface 107 and conductor 101 will result in sufficient damage of a sensor strip 105 to electrically open the strip before external contact is made with conductor 101.

Figure 2:
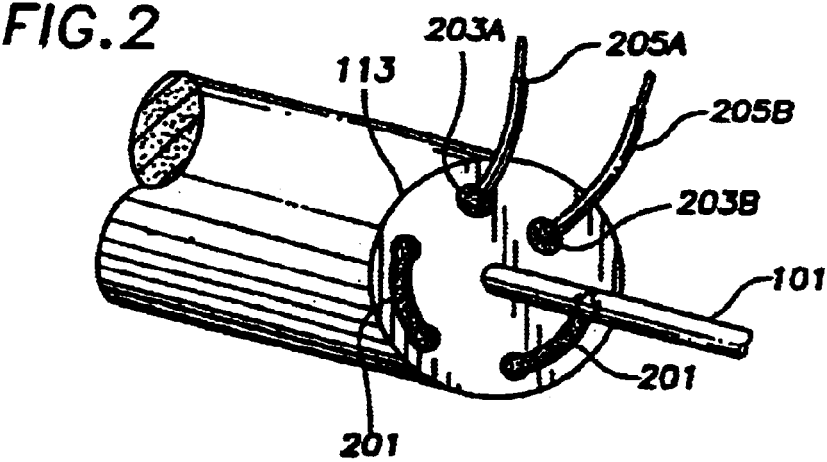
FIG. 2 is a perspective end view of the connection end of the fault sensing wire of FIG. 1.

In one embodiment, sensor strips 105 are connected by shunts 109 at end 111 and shunts 201 at end 113 (FIG. 2) to form an extended series-connected sensor strip. Terminals 203A and 203B for the connection points for the beginning and the end of the series-connected loop of sensor strips 105. In this manner, an open in any sensor strip 105; for example, in sensor 105A, results in an open as measured at terminals 203A and 203B. An increase in impedance of any sensor strip 105 (in sensor strip 105A or 105B, for example) due to an increase in temperature of the strip will also be indicated by an increase in impedance at terminals 203A and 203B. Terminal wire 205A provides a connection to terminal 203A and terminal wire 205B provides a connection to terminal 203B. Shunts 109 and 201 may be metallic conductors, conductive polymers, adhesives, or other conductors providing a current path between the ends of selected sensor strips. Terminal wires 205A and 205B provide connections to sensor circuitry discussed in the following figures.

Sensor strips 105 of FIG. 1 perform the function of a temperature responsive element and mechanical damage sensing element. In an alternative embodiment, one or more sensor strips 105 (such as sensor strip 105B) may be replaced by a conductive strip which acts only as a mechanical damage responsive element. The purpose of such an element would be mechanical damage sensing as described above only. The temperature coefficient of resistivity would be of no importance as long as the magnitude remained small throughout the temperature range as compared with sensor strips 105 which act as both temperature responsive elements and mechanical damage responsive elements.

A plurality of strips disposed as strips 105 of FIG. 1 would be required to perform a practical mechanical damage sensing function. For example, a single element or strip would detect mechanical damage from only a single radial portion of the wire insulation. Multiple strips would detect mechanical damage of multiple radial portions of the wire cross section. The intent of the strips is to produce an open circuit if the insulation becomes cracked or separated, or alternatively, if an exterior object cuts, frays, or abrades the wire insulation before the external object contacts the conductor. The more mechanical damage responsive elements used, the greater the effectiveness of the mechanical damage sensing function provided by the strips.

At least two longitudinal strips are used as mechanical damage responsive elements for the configuration of FIG. 1, and in the preferred embodiments, at least four longitudinal strips are used. In the preferred embodiments, the strip diameter (or longest cross sectional dimension) is small compared to the insulation thickness. In the preferred embodiments, the strip diameter is less than 25% of the insulation thickness between the conductor and the closest outside surface.

Figure 3:
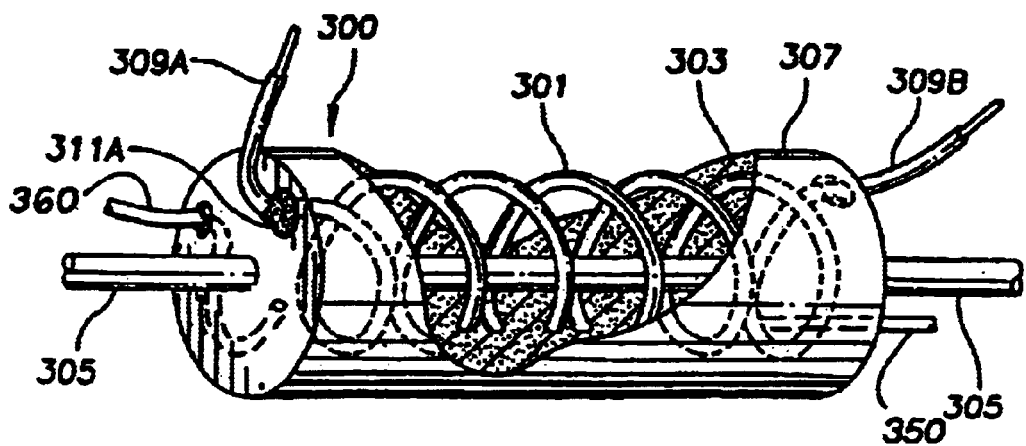
FIG. 3 is a partial cutaway perspective drawing of an alternative embodiment of the fault sensing wire of the present invention utilizing a helical sensor strip surrounding the conductor in an insulated wire.

FIG. 3 is an alternative embodiment of a fault sensing wire 300 protected by sensor strip 301. Sensor strip 301 is a conductive polymer strip as described above, disposed in a helical relationship in insulation 303 about conductor 305 of wire 300. Positioned in this manner, mechanical abrasion, cutting or fraying of outside surface 307 of wire 300 will result in opening of sensor strip 301 before conductor 305 is exposed. Terminal wires 309A and 309B provide connections to sensor circuitry. Connector 311A, connecting sensor strip 301 to terminal wire 309A may be a conductive polymer, conductive adhesive, or conductive hot melt adhesive. In another embodiment, terminal wire 309A may simply be an extension of sensor strip 301. In an alternate embodiment, a second helical sensor strip 360 may be used, comprising a conductive polymer material having a positive temperature coefficient which increases with temperature, providing a temperature switching effect, the second helical sensor strip 360 wound in a helix of opposite hand from the first helical sensor strip 301.

Sensor strip 301 may combine the functions of a temperature responsive element and a mechanical damage responsive element as described above, or separate elements may be used. For example, a mechanical damage responsive element of a metallic material may be wrapped in a helical pattern in insulation 303 (similar to the configuration of sensor strip 301). A temperature responsive element (such as optional element 350 in FIG. 3) made of a conductive polymer material with a temperature coefficient of resistivity which increases with temperature and in the configuration of sensor strip 105 of FIG. 1 may be disposed in insulation 303, inside the mechanical damage responsive element and parallel to conductor 305.

In the preferred embodiments, sensor strips such as sensor strips 105 of FIG. 1 are co-extruded together with the insulation in a die as the wire is drawn through the die. Nozzles in the die deposit strips 105 as the insulation is extruded in the die. Sensor strip 301 of wire 300 may be co-extruded in a similar manner by rotating the die, nozzles of the die, or the conductor itself during the extrusion of insulation 303. In other embodiments, sensor strip 301 may be wrapped around an insulated conductor, and an insulating jacket applied over sensor strip (not shown). Still other configurations of fault sensing wire are shown in U.S. Pat. No. 5,541,803 and U.S. Pat. No. 5,841,617.

Figure 4:
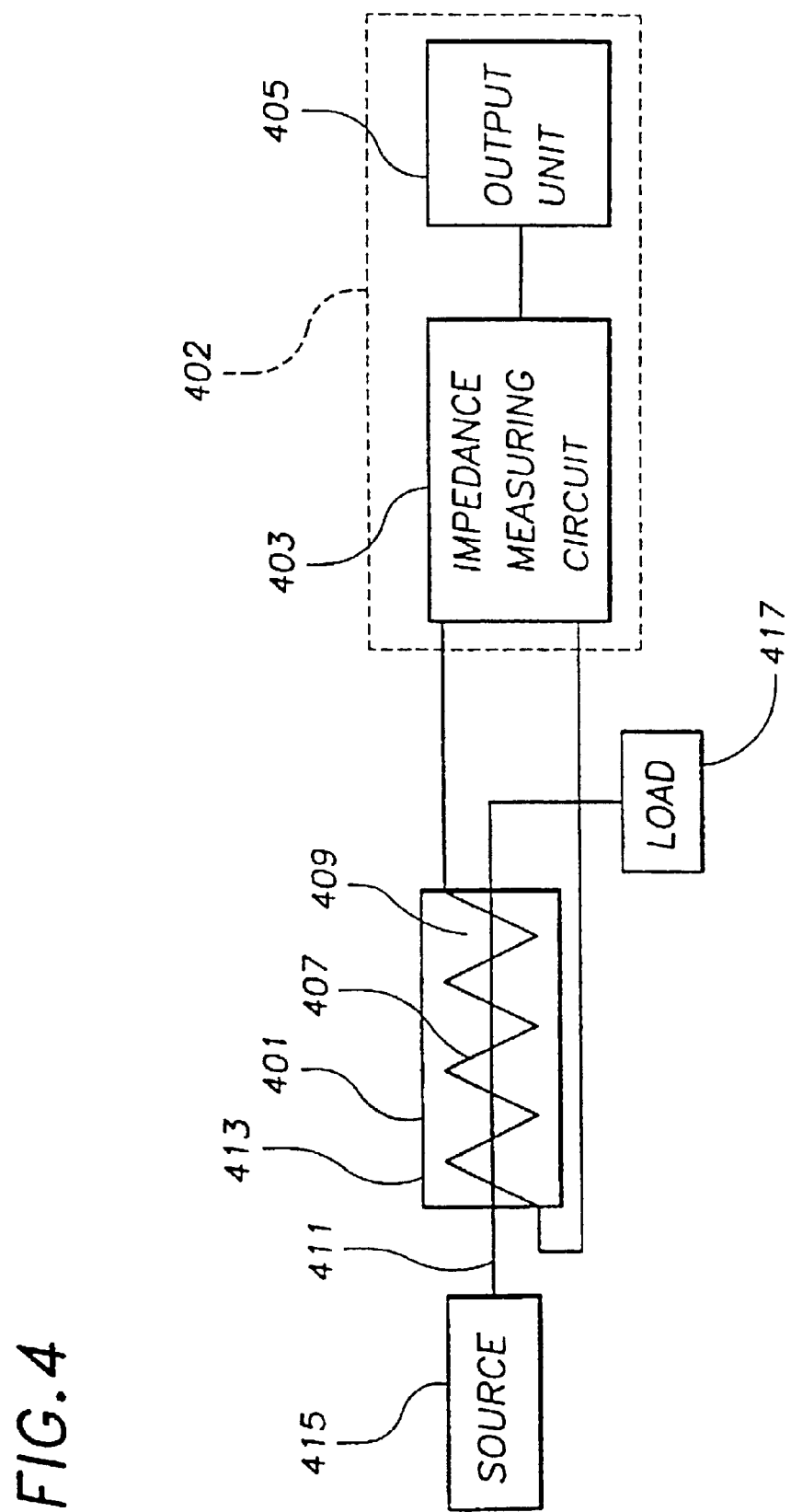
FIG. 4 is a block diagram of a fault sensing wire of the present invention connected to a control unit for producing an alarm or other action output as a result of an unsafe condition of the wire.

FIG. 4 is a block diagram of a fault sensing wire 401 of the present invention connected to a control unit 402 comprising impedance measuring circuit 403 and at least one output unit 405. Output unit 405 provides a control signal that results in a warning or protection action resulting from an unsafe condition of wire 401. In the preferred embodiment, wire 401 comprises a sensor strip 407 disposed in insulation 409 between conductor 411 and outside surface 413 so that mechanical damage to insulation 409 results in opening of sensor strip 407 before conductor 411 is exposed to objects or medium external to outside surface 413. Either an open circuit in sensor strip 407, or a high impedance of sensor strip 407 resulting from high temperature of sensor strip 407 is sensed by impedance measuring circuit 403. Depending upon the level of impedance, output unit 405 may supply a control or output signal to an overtemperature alarm, or a circuit trip relay opening the current path between source 415 and 417.

Figure 5:
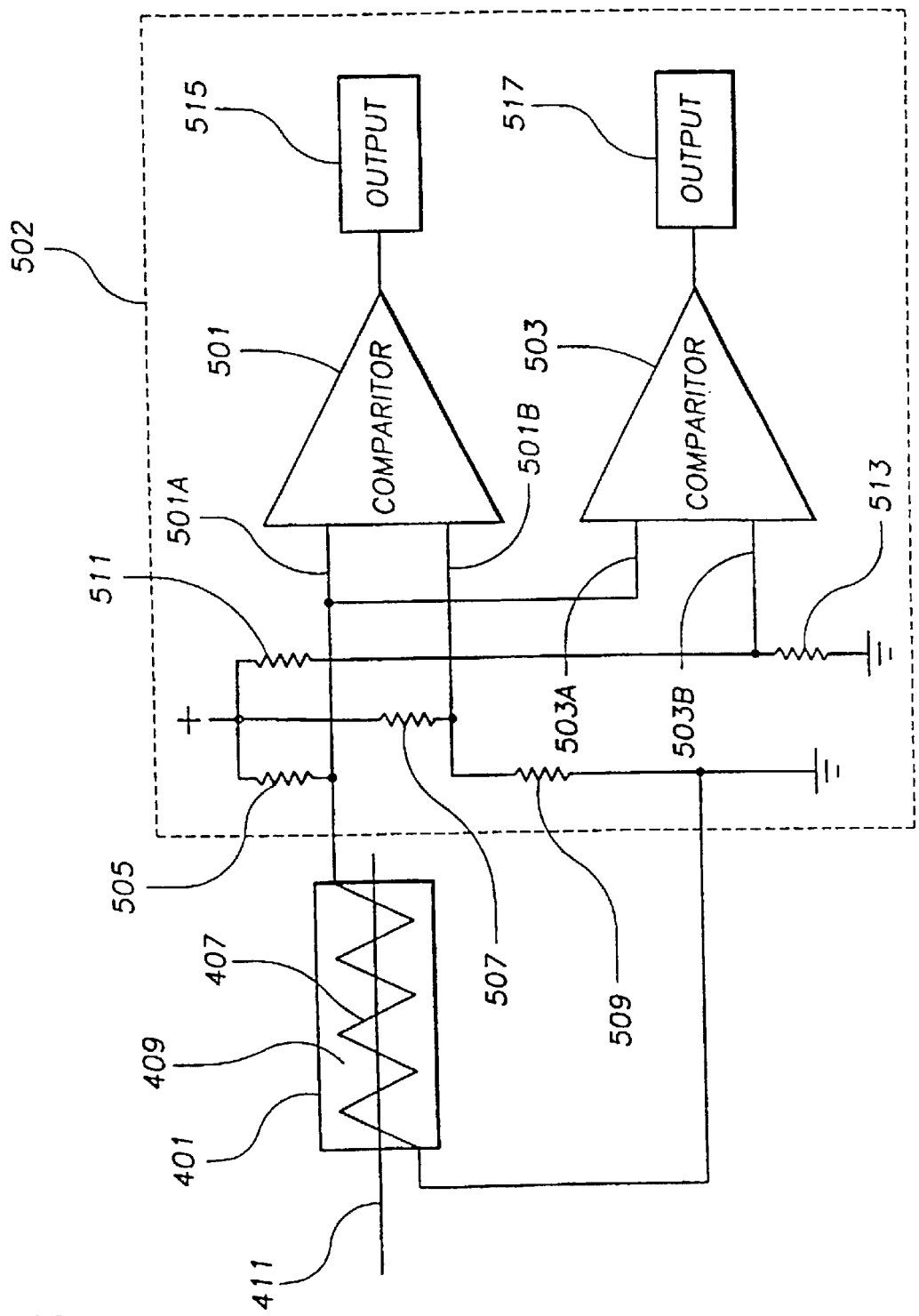
FIG. 5 is a block diagram of an alternative embodiment of the present invention where the control unit comprises several comparators to monitor the impedance of a sensor strip to perform more than one sensor response.

FIG. 5 is an alternative embodiment utilizing multiple comparators 501 and 503 as control unit 502. Resistor 505 and sensor strip 407 form a voltage divider, with the voltage dropped across sensor strip 407 applied to connection 501A of comparator 501 and connection 503A of comparator 503. A second voltage divider formed by resistors 507 and 509 form a reference voltage applied to connection 501B of comparator 501. A third voltage divider formed by resistors 511 and 513 form a reference voltage applied to connection 503B of comparator 503. The state of comparator 501 changes when the resistance of sensor strip 407 rises to a value where the voltage at connection 501A is greater than the voltage at connection 501B. Likewise, the state of comparator 503 changes when the resistance of sensor strip 407 rises to a value where the voltage at connection 503A is greater than the voltage at connection 503B.

Output 515 of comparator 501 initiates another device such as an audio or visual alarm representing a predetermined resistance of the sensor strip. Output 517 of comparator 503 controls another device such as a circuit breaker or relay representing a second predetermined resistance of sensor strip 407. Additional comparators (not shown) may provide outputs for other resistance levels. In still other embodiments, a voltage indicating device such as a voltmeter may be added at connection 501A or 503A to indicate the voltage corresponding to the resistance (and therefore the temperature) of sensor strip 407.

Figure 6:
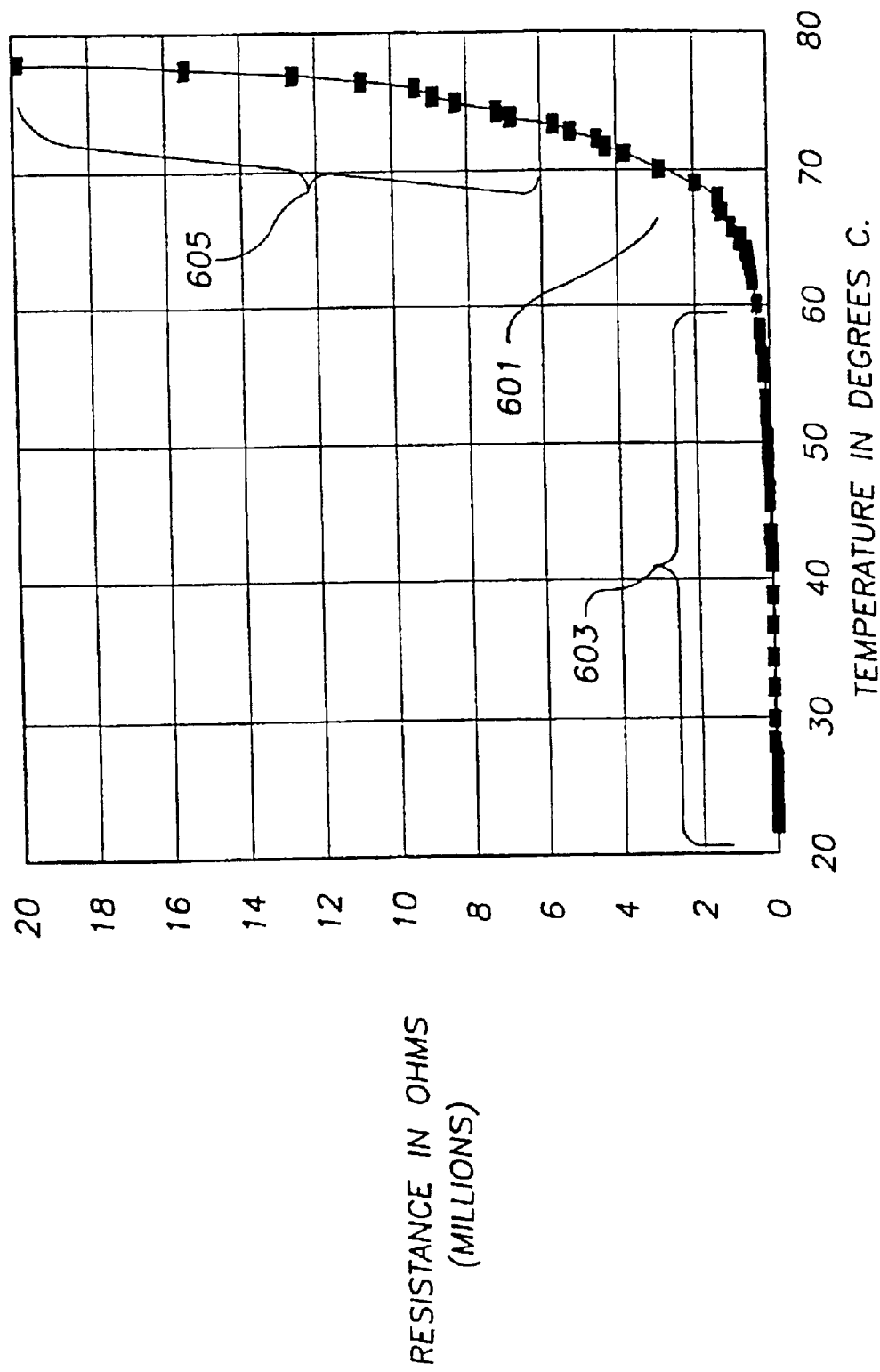
FIG. 6 is a resistance vs. temperature graph of a sensor strip showing multiple response ranges.

FIG. 6 is a resistance vs. temperature graph for a typical filled polymer material. For the example given, the sensor strip was a carbon particle filled low density polyethylene, 0.330 cm×0.152 cm×15.24 cm long. At temperatures below the switching temperature, generally indicated by 601, the resistance increases slowly and, over smaller regions, nearly linearly with temperature. At temperatures greater than the switching temperature, the resistance increases rapidly with temperature and is highly non-linear.

In one embodiment of the invention, the region of the graph below the switching temperature (indicated generally by 603) is used as a measurement range 603. If the entire sensor strip is subject to the same temperature, the sensor strip will act similar to a discrete temperature sensor, with the temperature indicated by the measured resistance in region 603. Even if the entire sensor strip is not subject to the same temperature, empirical or calculated results may be used to indicate the temperature of the portion of the strip of interest. Region 605 of the graph may be used as an alarm or action area, in that resistance values in this region may be indicative of excessive temperatures, whether the affected length is short or over the entire length of the sensor strip. A third measurement range, above region 605 may be used as an indication of an open circuit, therefore indicating an opening of the sensor strip or another fault in the circuitry.

The different response regions of a conductive polymer as shown in FIG. 6 allows the device of FIG. 5 to provide multiple outputs based on different real or potential faults. For example, selection of an appropriate setpoint for comparator 501 of FIG. 5 may initiate an alarm for a resistance value near switching temperature 601 or in the lower part of region 605 of FIG. 6. Such a resistance value may represent a high, but not damaging, overcurrent in the wire causing the temperature of the whole wire to increase to a temperature above normal. This same set point may represent a short section of wire overheating to a greater degree, but not necessarily to a damaging level. Selection of a higher set point of comparator 503, would indicate either an overtemperature of the whole length of the sensor strip (such as that occurring from an excessive overcurrent in conductor 411) or significant and possibly damaging overtemperature of a short section of wire 401 insulation. Under either of these conditions, comparator 503 would change states, causing its output to produce a circuit trip of current through conductor 411. In an alternative embodiment, the setpoint of a comparator may be set for a value representing a resistance above region 605, therefore initiating an response indicative of mechanical damage to insulation 409 of wire 401 (opening of a sensor strip).

Figure 7:
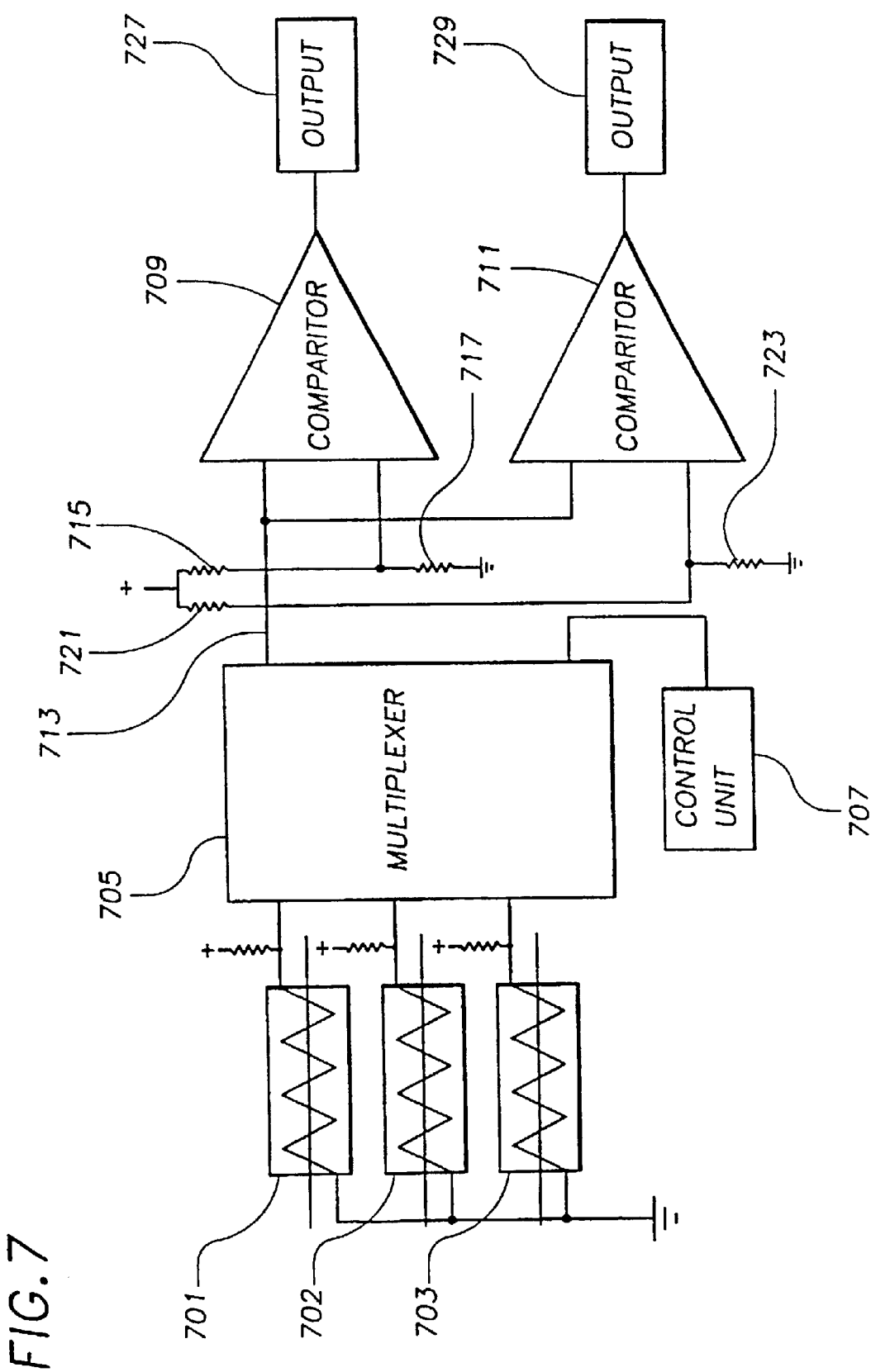
FIG. 7 is a block diagram of an alternative embodiment of the present invention utilizing multiple fault sensing wires, a multiplexer and multiple comparators to perform multiple responses to multiple sensor inputs.

FIG. 7 is a combined schematic and block diagram of an alternative embodiment employing multiple fault sensing wires 701, 702 and 703. The sensing strip output voltage (representing the resistance of the sensor strip) of each protected wire is supplied to multiplexer 705. A control unit 707 selects the desired input to multiplexer 705 and applies it to comparator 709 and 711 from terminal 713 of the multiplexer. A voltage divider formed by resistors 715 and 717 provide the setpoint for comparator 709 and a voltage divider formed by resistors 721 and 723 provide a setpoint for comparator 711. Output 727 of comparator 709 provides the desired alarm or action response to the change of state of comparator 709 and output 729 provides the desired alarm or action response for the change of state of comparator 711. In this manner, the device provides multiple alarms or action responses for each of the fault sensing wire sensor strips connected to the inputs of multiplexer 705.

Figure 8:
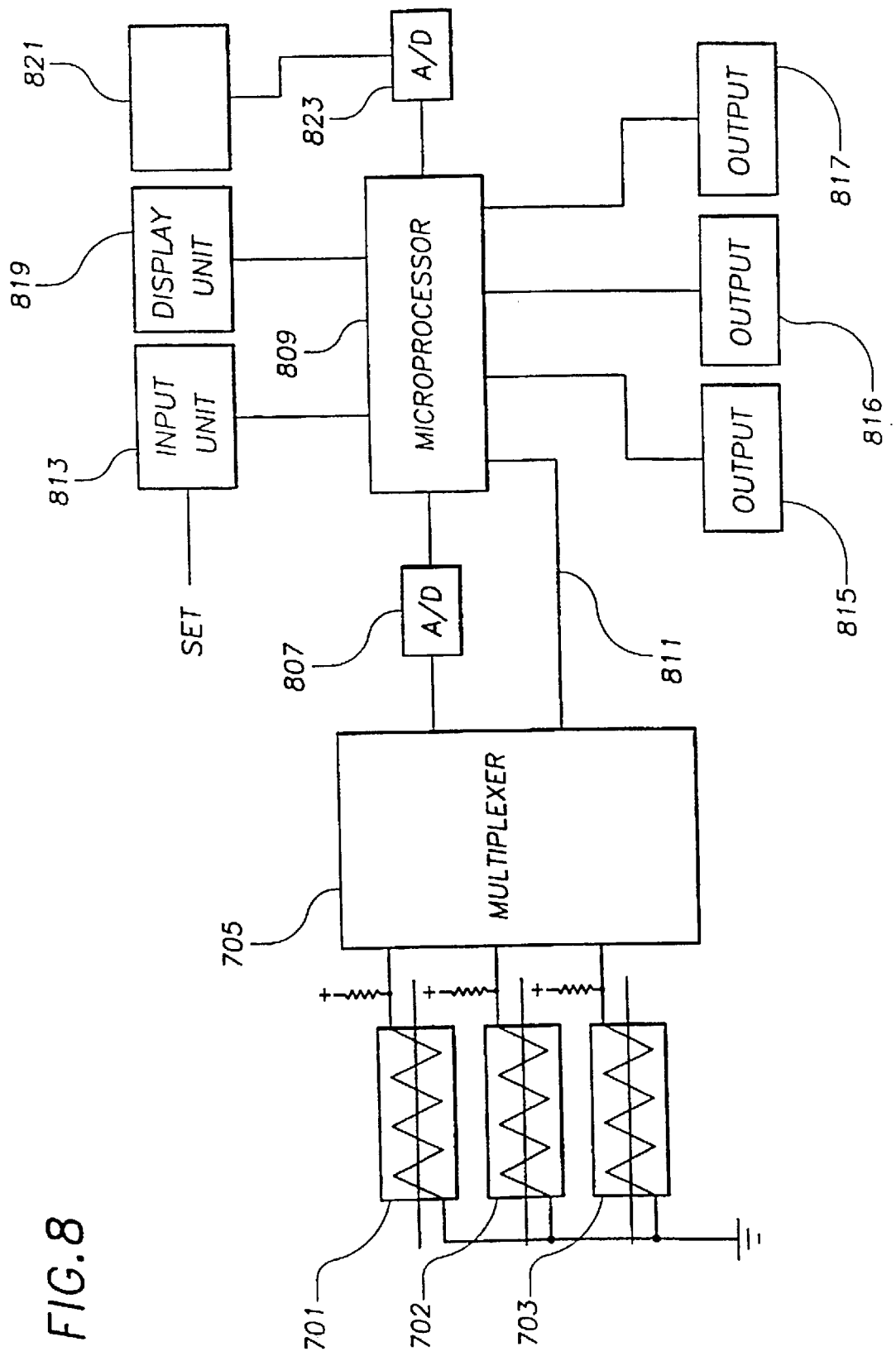
FIG. 8 is a combined schematic and block diagram of still another embodiment of the present invention utilizing multiple fault sensing wires, a multiplexer and a microprocessor to perform multiple responses to multiple sensor inputs.

FIG. 8 is a block diagram of an alternative embodiment of the device in which the output of multiplexer 705 is fed to analog to digital converter 807 and to the input of microprocessor 809. Microprocessor 809 communicates through connection 811 to multiplexer 705 to select the desired sensor strip output and apply it to A/D converter 807. The selection of the desired fault sensing wire sensor output is determined either manually by the input unit 813, or by a program residing in the microprocessor. The microprocessor compares the selected sensor strip output to one or more setpoints stored in the microprocessor and activates output 815, 816 or 817 as appropriate. Input unit 813 is used to provide desired setpoints for each sensor strip, program the microprocessor, and provide manual control of the unit. Display unit 819 provides display of selected sensor strip, the value of the sensor strip output, and the present setpoints of the selected sensor strip. Display unit 819 is also used for display purposes during programming of the microprocessor.

An environmental sensor 821, connected to microprocessor 809 through A/D converter 823 can also be used optionally in combination with the multiplexer/microprocessor as shown in FIG. 8. This environmental sensor is used to update the stored parameters in the microprocessor's memory to allow for an adaptive logic mode for the monitoring of the fault sensing wires (701, 702, and 703) as show in FIG. 8D. The use of this environmental sensor will be described later. This modification would allow for the adjustment of the stored setpoints in the fault sensing electrical device as its external surrounding were changed.

Figure 8A:
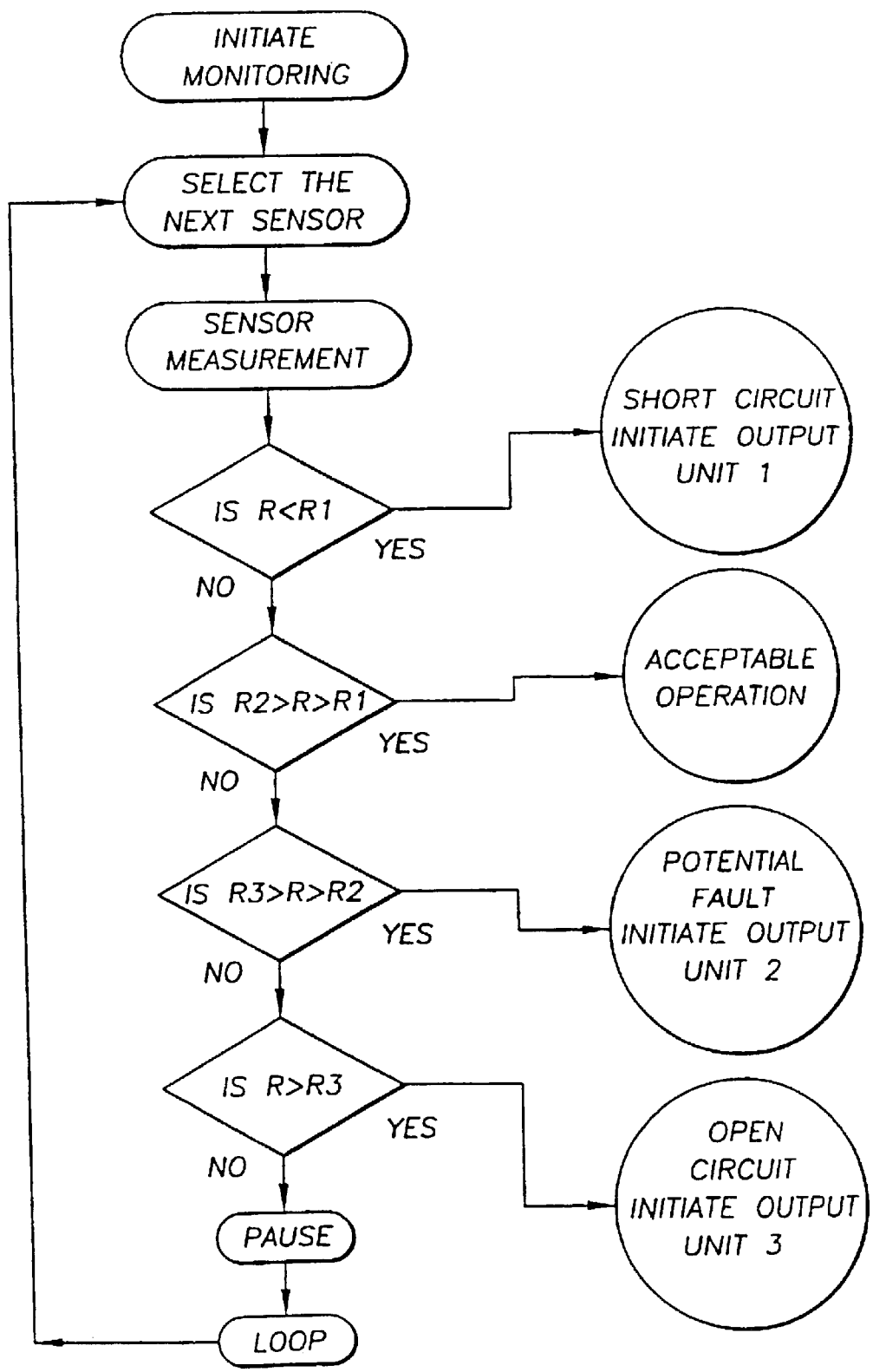
FIG. 8A is a logic diagram of the monitoring mode of the microprocessor of FIG. 8.
Figure 8B:
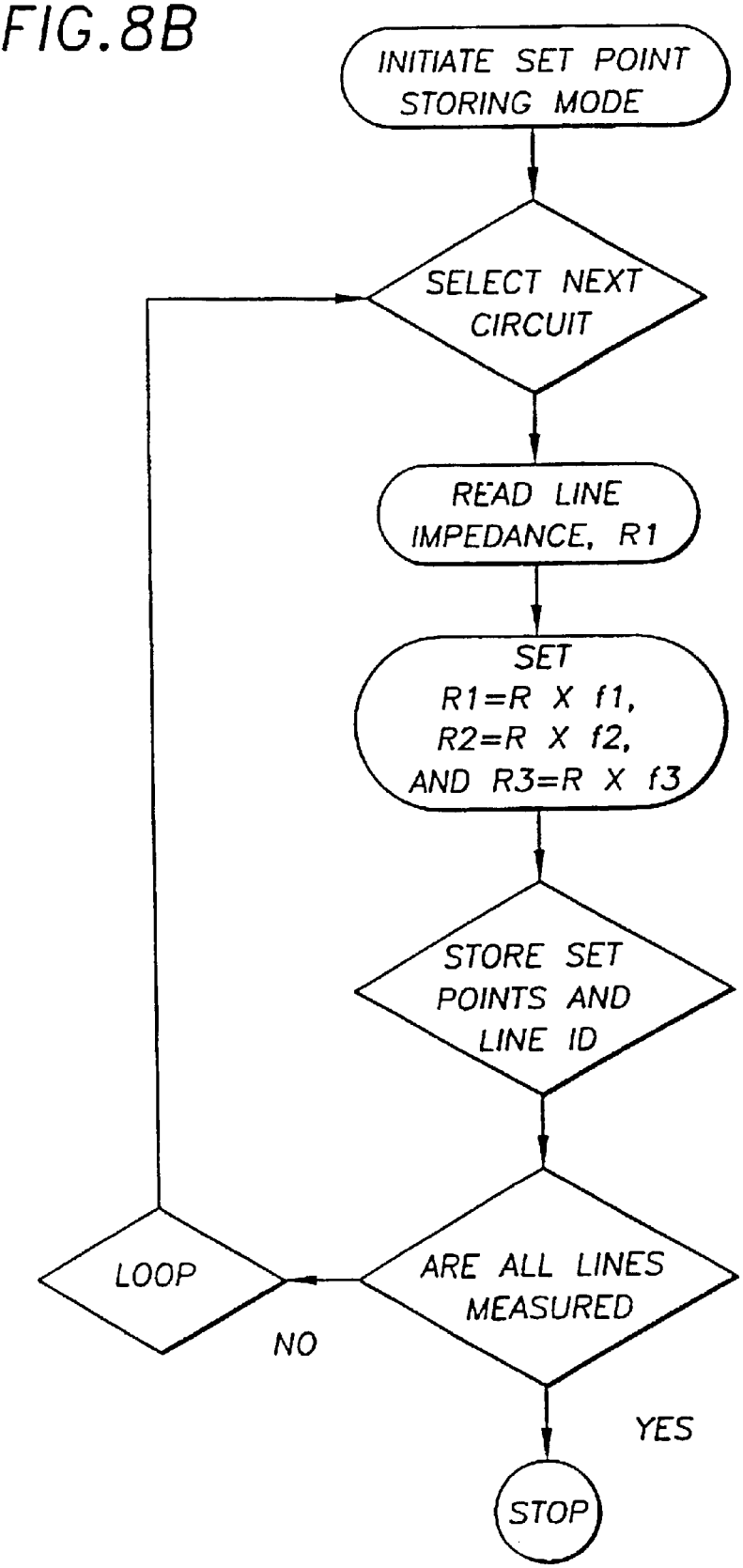
FIG. 8B is a logic diagram of the setpoint loading mode of the microprocessor of FIG. 8.

FIGS. 8A and 8B demonstrates the operation of the multiplexer/microprocessor circuit shown in FIG. 8. FIG. 8A shows the operation of the multiplexer/microprocessor circuit in the fault monitoring mode. The multiplexer shown in FIG. 8 selects each of the sensor strip outputs in a preselected order. For each sensor strip the circuit ID and the measured impedance of the circuit is sent to the microprocessor to be compared with set impedances which are used to determine the status of the selected circuit. These impedance setpoints are determined in the setpoint input mode which can be initiated by the operator and is described in FIG. 8B. In the monitoring mode shown in FIG. 8A the measured impedance for each sensor strip is compared with setpoint impedance and the proper action is taken as indicated the logic branches of FIG. 8A. After these tests are completed successfully the multiplexer is allowed to pause for a preselected amount of time before proceeding to the next sensor strip. At the start of this process and at preselected interval, the operator shall initiate the setpoint input mode as shown in FIG. 8B. This must be done, at the minimum, at the start of the monitoring process for a specific group of sensor strips. In the setpoint input mode, shown in FIG. 8B, each monitored sensor strip impedance is measured and a predetermined group of constants, f1, f2, and f3 are used to compute setpoints R1, R2, and R3 for each of the monitored sensor strips. Each of these setpoints along with the identification of each of the sensor strips is stored in the microprocessor's memory for use in the monitoring mode as described in FIG. 8A.

Figure 8C:
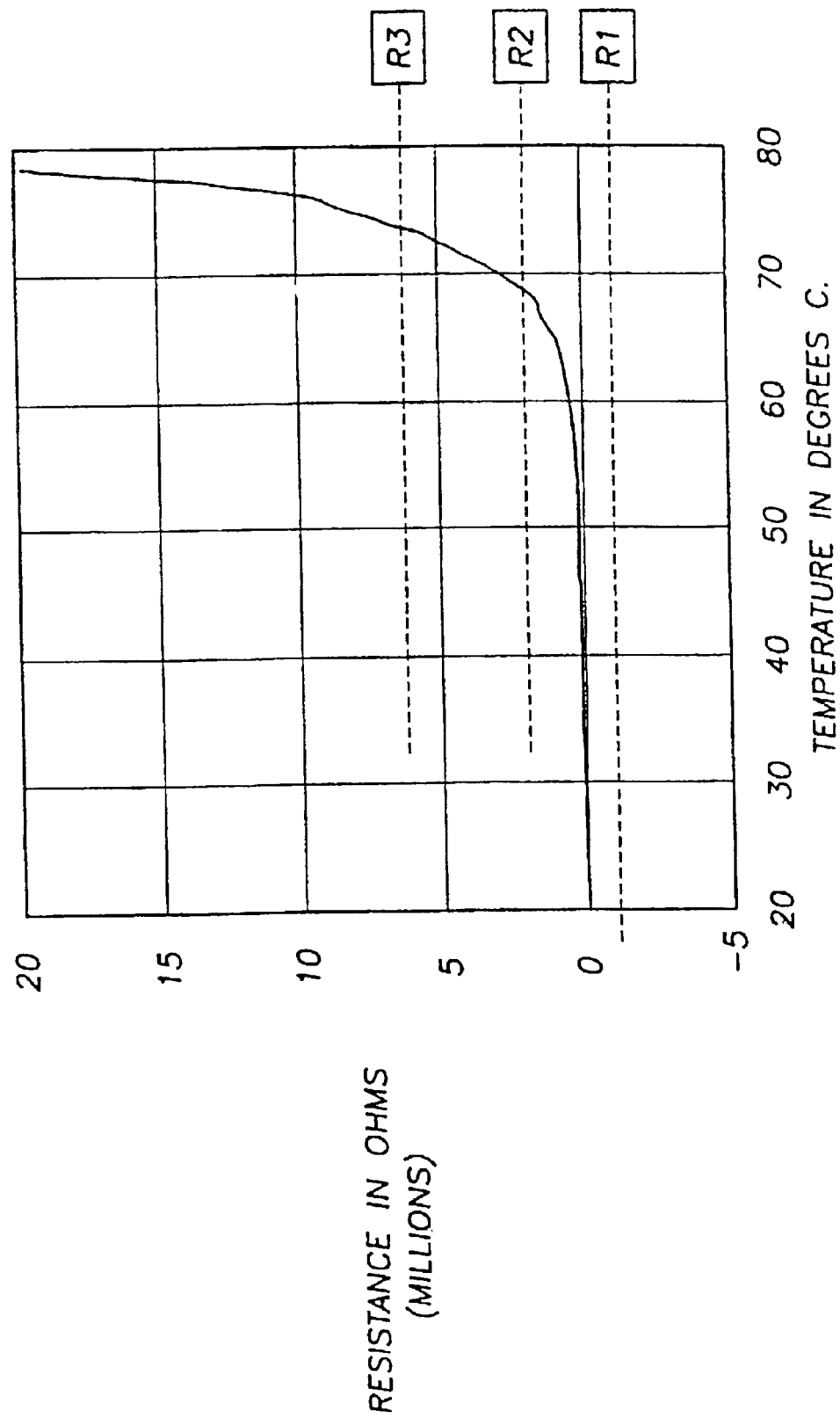
FIG. 8C is the function curve for the microprocessor of FIG. 8.

FIG. 8C indicates the identification and usage of the stored setpoint impedances R1, R2, and R3 for each of the sensor strips. R1 is the lower limit of the acceptable range of operation of the considered sensor strip. A measured impedance below this value is considered to represent a short circuit of sensor strip and the appropriate signal is sent to output unit 1 as shown in FIG. 8A. R2 represents the upper level of the acceptable range of operation of the sensor strip. Any measured impedance above this value and below the impedance value R3 for the sensor strip is considered to represent a potential fault and output unit 2 is activated as shown in FIG. 8A. If the measured impedance in the monitoring mode is above the setpoint impedance R3 a definite fault is considered to have occurred and output unit 3 is activated as shown in FIG. 8A. Additional impedance setpoints may be added as required. Logic gate and timer functions performed by the microprocessor may be used to provide alarms or actions based on the magnitude and rate of change of impedance of the monitored sensor strip.

FIG. 8D describes the possibility to modify the constants f1, f2, and f3 described above and shown in FIG. 8B to adjust the monitoring mode's setpoints for changes in the fault sensing wire's environment which might lead to false fault indications. In the adaptive logic mode, the f1, f2, and f3, values are determined by the environmental sensor, such as an external temperature sensor. Setpoints R1, R2, and R3 values are adjusted according the setpoint mode of FIG. 8B and stored in the microprocessor's memory. The remainder of this adaptive logic monitoring mode proceeds as the monitoring mode described above and shown in FIG. 8A.

Figure 9:
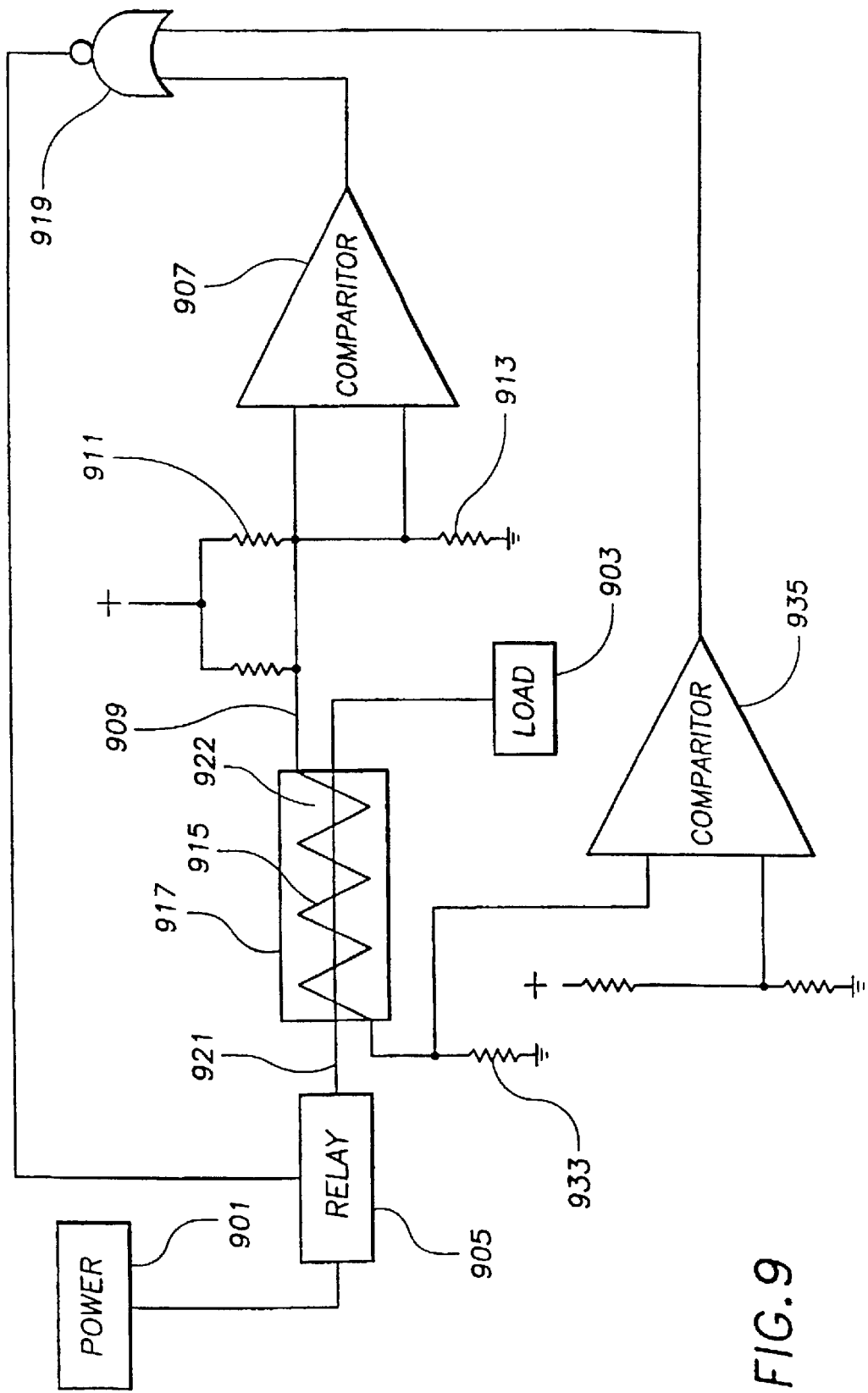
FIG. 9 is a block diagram of an embodiment comprising a current sensing element in the sensor strip current path, providing an arc sensing capability to the apparatus.

FIG. 9 is an alternative embodiment of the device with power source 901 supplying load 903 through relay 905. Comparator 907 serves as an impedance measuring circuit by changing states when the voltage at the sensor strip output point 909 exceeds the reference voltage set by the value of resistors 911 and 913. A high voltage corresponding to an excessive temperature or open circuit of sensor strip 915 of fault sensing wire 917 results in a high output of comparator 907. The high output results in a low output of NOR gate 919, tripping relay 905 and de-energizing conductor 921 supplying load 903.

The device may also act as an arc sensing device. A fault resulting in current flow through insulation 922 between conductor 921 and sensor strip 915 will result in the potential at sensor strip output 909 rising as long as the arc potential is greater than the nominal local voltage of the sensor strip at the point of fault. A sufficient increase in the potential at output 909 will result in a trip of normally open relay 905, thus stopping the arc. The relay may require manual resetting before restoring of power to load 903.

A secondary arc sensing mode is performed by resistor 933, which acts as an arc current detector. An arc resulting in a current path through insulation 922 sufficient to increase the potential of sensor strip 915 will result in increased current flow through resistor 933. The voltage increase across resistor 933 changes the state of comparator 935 to high. The high output of comparator 935 changes NOR gate 919 output to low, tripping normally open relay 905. An arc through insulation 922 may result from mechanical damage to insulation 922, or chemical or thermal deterioration of the insulation. Excessive conductor 921 voltage may also cause an arcing condition.

In AC circuits, a differential transformer winding may be substituted for resistor 933 and comparator 935. The differential transformer would result in a trip signal upon excessive current through the coil. In another embodiment, the differential coil is wound on the differential transformer of a ground fault device. In this embodiment, the ground fault device would trip in the event of a sufficient arc between the hot conductor and the sensor strip.

Although the preferred embodiments connect the mechanical damage responsive elements and the temperature responsive elements of a fault sensing wire in series, the separate elements or sensor strips may be monitored individually by a control circuit. For example, sensor strips 105 of FIG. 1 may be monitored individually, as groups, or as a single series-connected loop.

In other applications, the fault sensing circuitry may be combined with other fault sensing elements, such as circuit breakers, fuses, ground fault circuit interrupters, and arc sensors.

Accordingly the reader will see that the FAULT SENSING WIRE AND ALARM APPARATUS provides overtemperature indication and protection for electrical wire not previously available. The device provides the following additional advantages:

The sensor wire provides indication of conditions which may lead to electrical faults, leaving time for inspection and repair of wiring before a fault occurs;

The sensor wire provides distributed temperature sensing over the full length of the wire;

The sensor wire is responsive to overtemperature regardless of the cause or source of the overtemperature;

The "switch" impedance response allows discriminating between different potential failure modes; and The sensor wire may be used to sense an arc between the conductor and the sensor strips.

Although the description above contains many specifications, these should not be construed as limiting the scope of the invention but as merely providing illustrations of some of the presently preferred embodiments of this invention. For example, an optical conductor may be substituted for an electrical conductor. Thus the scope of the invention should be determined by the appended claims and their legal equivalents, rather than by the examples given.

We claim:

1. An apparatus for sensing over-temperature and mechanical damage in electrical wiring, comprising:

at least one fault-sensing electrical wire comprising an electrical conductor surrounded by insulation and at least one sensor strip disposed in said insulation along substantially the length of said wire, said at least one sensor strip spaced apart from said conductor by a strip separation space said at least one sensor strip performing a temperature-responsive function and a mechanical damage-sensing function, said temperature-responsive function provided by use of a material in said at least one sensor strip having a positive temperature coefficient of resistivity which increases with temperature and said mechanical damage-sensing function provided by including a portion of said at least one sensor strip disposed between said conductor and an outside surface of said wire so that mechanical damage to said insulation severs said portion of said at least one sensor strip before said conductor is exposed;

a control unit responsive to the impedance of said at least one sensor strip, said control unit providing a first control signal responsive to a first thermal condition of said at least one sensor strip and a second control signal responsive to severance of said at least one sensor strip; and an arc sensor comprising a circuit configured to sense a current flow across said strip separation space.

2. The apparatus of claim 1, wherein said at least one sensor strip is wound in a generally helical relationship about said electrical conductor.

3. The apparatus of claim 1, wherein said fault comprises a return path, and wherein said circuit comprises a current sensor positioned between said at least one sensor strip and said return path.

4. The apparatus of claim 1, wherein said at least one sensor strip comprises:

a metallic sensor strip disposed in the insulation and wound in a generally helical relationship about said electrical conductor; and a second sensor strip disposed in the insulation, said second sensor strip comprising a conductive polymer material having a positive temperature coefficient which increases with temperature, providing a temperature switching effect.

5. The apparatus of claim 4, wherein said second sensor strip is wound in a generally helical relationship of opposite hand compared to said metallic sensor strip.

* * * * *